Patented Aug. 29, 1950

2,520,280

UNITED STATES PATENT OFFICE 2,520,280

NITRILE SUBSTITUTED DITHIOCAR-
BAMATE DERIVATIVES

Marion W. Harman, Nitro, W. Va., assignor to
Monsanto Chemical Company, St. Louis, Mo., a
corporation of Delaware No Drawing. Application June 9, 1945,
Serial No. 598,653

5 Claims. (Cl. 260—429)

The present invention relates to a new class of compounds and to the process of making them.

The compounds of the present invention comprise N-cyano alkyl substituted dithiocarbamic acids and their derivatives. These compounds contain the grouping

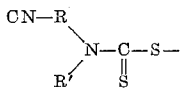

where R is an alkylene group and R' is an alkyl group which may be substituted. Thus the alkyl group may be of the straight chain type or the alicyclic type as for example cyclohexyl or an aryl substituted or other substituted alkyl group, as for example benzyl and in general any organic group having a carbon atom of an alkyl chain linked to the nitrogen atom. The alkyl chain may be interrupted by nitrogen, oxygen, sulfur or other elements. Since the dithiocarbamic acids are unstable substances they are isolated in the form of their derivatives, particularly primary, secondary and tertiary amine salts, metallic salts, thiuram monosulfides, disulfides and polysulfides.

Carbon disulfide combines readily with cyano substituted secondary alkyl amines to form cyano alkyl substituted secondary amine salts of the cyano alkyl substituted dithiocarbamic acid. If the reaction is carried out in the presence of a tertiary amine, as for example N-N-dimethyl cyclohexylamine, a tertiary amine salt is formed and in the presence of alkali metal hydroxide, the alkali metal salts are formed. Heavy metal salts are precipitated upon the addition of a soluble salt of the heavy metal to an aqueous alkaline solution of dithiocarbamic acid. Thiuram disulfides are prepared by oxidation in aqueous alkaline solution of the dithiocarbamic acids and thiuram monosulfides result from the removal of one atom of sulfur from the thiuram disulfide in known manner. Thiuram polysulfides may be prepared by the action of sulfur chlorides on the dithiocarbamates.

Typical examples of the new compounds which illustrate the invention but are not to be taken as limiting the invention are the amine and metallic salts, and the thiuram sulfides from the following dithiocarbamic acids: N-2-cyano ethyl, N-methyl dithiocarbamic acid; N-2-cyano ethyl, N-ethyl dithiocarbamic acid; N-2-cyano n-propyl, N-ethyl dithiocarbamic acid; N-2-cyano isopropyl, N-ethyl dithiocarbamic acid; N-2-cyano ethyl, N-n-propyl dithiocarbamic acid; N-2- cyano ethyl, N-isopropyl dithiocarbamic acid; N-2-cyano n-propyl, N-n-propyl dithiocarbamic acid; N-2-cyano isopropyl, N-isopropyl dithiocarbamic acid; N-2-cyano ethyl, N-n-butyl dithiocarbamic acid; N-2-cyano ethyl, N-sec. butyl dithiocarbamic acid; N-2-cyano ethyl, N-tertiary butyl dithiocarbamic acid; N-2-cyano ethyl, N-isobutyl dithiocarbamic acid; N-2-cyano n-propyl, N-n-butyl dithiocarbamic acid; N-2-cyano ethyl, N-n-amyl dithiocarbamic acid; N-2-cyano ethyl, N-isoamyl dithiocarbamic acid; N-2-cyano ethyl, N-tertiary amyl dithiocarbamic acid; N-2-cyano ethyl, N-hexyl dithiocarbamic acid; N-2-cyano ethyl, N-octyl dithiocarbamic acid; N-2-cyano ethyl, N-n-nonyl dithiocarbamic acid; N-2-cyano ethyl, N-2-nonyl dithiocarbamic acid; N-2-cyano ethyl, N-decyl dithiocarbamic acid; N-2-cyano ethyl, N-n-undecyl dithiocarbamic acid; N-2-cyano ethyl, N-2-undecyl dithiocarbamic acid; N-2-cyano ethyl, N-dodecyl dithiocarbamic acid; N-2-cyano ethyl, N-pentadecyl dithiocarbamic acid; N-2-cyano n-propyl, N-allyl dithiocarbamic acid; N-2-cyano isopropyl, N-2-hydroxy ethyl dithiocarbamic acid; N-cyano methyl, N-2-hydroxy ethyl dithiocarbamic acid; N-1-cyano n-butyl, N-2-hydroxy n-propyl dithiocarbamic acid; N-2-cyano isopropyl, N-benzyl dithiocarbamic acid; N-2-cyano ethyl, N-chlorbenzyl dithiocarbamic acid; di(N-2-cyano ethyl) dithiocarbamic acid and equivalents and analogues thereof.

An important group of cyano substituted secondary alkyl amines useful for the preparation of the new compounds can be prepared from primary alkyl amines and unsaturated open chain nitriles as described in United States Patent No. 1,992,615, granted to Hoffmann et al. The method comprises mixing equimolecular proportions of an unsaturated open chain nitrile and a primary alkyl amine or reacting two molecular proportions of an unsaturated nitrile with ammonia. Other methods of synthesis are described in United States Patent No. 1,972,465, granted to Ulrich et al. The following examples illustrate the preparation of the new compounds but again are not to be taken as limitative of the invention.

Into a suitable container fitted with a reflux condenser there was charged substantially 304 parts by weight of 2-cyano ethyl cyclohexyl amine (substantially two molecular proportions) and substantially 76 parts by weight of carbon disulfide (substantially one molecular proportion). An exothermic reaction set in immediately. The product was an amber resin essentially the N-2-cyano ethyl N-cyclohexylamine salt of N-2- cyano ethyl N-cyclohexyl dithiocarbamic acid. The yield was substantially quantitative or 380 parts by weight. In similar manner were prepared the N-2-cyano ethyl, N-n-butyl amine salt of N-2-cyano ethyl, N-n-butyl dithiocarbamic acid; the N-2-cyano ethyl, N-isopropyl amine salt of N-2-cyano ethyl, N-isopropyl dithiocarbamic acid; the N-2-cyano ethyl, N-n-amyl amine salt of N-2-cyano ethyl, N-n-amyl dithiocarbamic acid, the N-2-cyano ethyl, N-allyl amine salt of N-2-cyano ethyl, N-allyl dithiocarbamic acid and the N-2-cyano ethyl, N-dodecyl amine salt of N-2-cyano ethyl, N-dodecyl dithiocarbamic acid. The products were syrupy liquids and were obtained in substantially quantitative yield. On standing the 2-cyano ethyl, dodecyl amine derivative set to a jelly and the 2-cyano ethyl isopropyl amine derivative crystallized to a soft solid.

Into a suitable container fitted with a reflux condenser there was charged substantially 83.5 parts by weight (substantially 0.6 molecular proportion) of aqueous 33% ethyl amine and substantially 32.5 parts by weight (substantially 0.6 molecular proportion) of acrylonitrile. The nitrile was gradually added to the amine at 10–15° C. upon which an exothermic reaction set in. The charge was stirred for a short time at room temperature and substantially 23 parts by weight of carbon disulfide (substantially 0.3 molecular proportion) added to the clear colorless solution. The water and any unreacted carbon disulfide were removed by evaporation or other means leaving a residue of viscous yellow resin in nearly quantitative yield comprising the N-2-cyano ethyl N-ethyl amine salt of N-2-cyano ethyl N-ethyl dithiocarbamic acid.

Into a suitable container fitted with a reflux condenser there was charged substantially 42.8 parts by weight of benzyl amine and substantially 21.2 parts by weight of acrylonitrile (substantially 0.4 molecular proportions of each). The charge was heated at 100–110° C. for about an hour, cooled below 50° C. and 15.2 parts by weight (substantially 0.2 molecular proportion) of carbon disulfide added while keeping the temperature below 50° C. The product was a clear brittle resin comprising the N-2-cyano ethyl N-benzyl amine salt of N-2-cyano ethyl N-benzyl dithiocarbamic acid. The yield was nearly quantitative.

Into a suitable reaction vessel fitted with a reflux condenser there was charged 53 parts by weight of acrylonitrile (substantially one molecular proportion) and substantially 50 parts by weight of aqueous 60% ethylene diamine (substantially 0.5 molecular proportion). The temperature was kept below 60° C. and after the strong exothermic reaction had subsided, the charge was stirred until it had cooled to room temperature. Substantially equimolecular proportions of the di(N-2-cyano ethyl) ethylene diamine so obtained and carbon disulfide were mixed keeping the temperature below 50° C. A viscous yellow oil formed immediately which set up to a clear resin. This product was believed to be an inner salt of N-2-cyano ethyl N-2-(2-cyano ethyl) amino ethyl dithiocarbamic acid, presumably of the structure

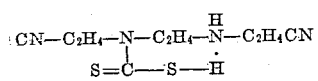

Substantially 25.8 parts by weight (0.125 molecular proportion) of di(N-2-cyano ethyl) ethylene diamine prepared as described above, 40 parts by weight of 25% aqueous caustic soda (substantially 0.25 molecular proportion) and 300 parts by weight of water were charged into a suitable reaction vessel. With suitable cooling 19 parts by weight (substantially 0.25 molecular proportion) of carbon disulfide was slowly added, the temperature of the reaction mixture being 15–25° C. during the addition. The mixture was stirred until clear and then a solution of 22.6 parts by weight of 89% zinc sulfate (0.125 molecular proportion) in 400 parts by weight of water was slowly added to the clear solution of disodium ethylene-bis-(N-2-cyano ethyl-dithiocarbamate). The zinc salt precipitated as a fine white precipitate. This product was filtered off, washed with water until free of sulfates and dried in an oven. The yield of zinc ethylene-bis-(N-2-cyano ethyl-dithiocarbamate) was substantially quantitative. These compounds when employed in vulcanizable rubber compositions exhibit the accelerating properties possessed and characterized by the dithiocarbamate vulcanization accelerators claimed in U. S. Patent 2,372,895 of April 3, 1945, granted to M. W. Harman.

An aqueous solution of the sodium salt of N-2-cyano ethyl N-n-butyl dithiocarbamic acid was prepared by mixing with cooling substantially 31.5 parts by weight (0.25 molecular proportion) of N-2-cyano ethyl N-n-butyl amine, 40 parts by weight of 25% sodium hydroxide, 125 parts by weight of water and 19 parts by weight (substantially 0.25 molecular proportion) of carbon disulfide. The temperature was kept at 20–30° during the reaction and the thiuram sulfide prepared by slowly adding to the clear yellow solution with further cooling an oxidizing mixture consisting of 16.9 parts by weight of 26.6% hydrogen peroxide, 13.1 parts by weight of 66° sulfuric acid and 125 parts by weight of water. The temperature was kept at 10–15° C. during the oxidation. A viscous brown syrup separated from which the aqueous layer was decanted and the syrup washed with water, taken up in ether or other solvent, dried and the solvent evaporated. A viscous syrupy residue was obtained in amount equivalent to a 90% yield of di(N-2-cyano ethyl N-n-butyl) thiuram disulfide. Sulfur calculated for $C_{16}H_{26}N_4S_4$ 31.8%; found 30.1%. Nitrogen calculated 13.9%; found 14.2%.

Substantially 36 parts by weight (substantially 0.125 molecular proportion) of $ZnSO_4.7H_2O$ in 250 parts by weight of water was added to an aqueous solution containing 0.25 molecular proportion of the sodium salt of N-2-cyano ethyl N-n-butyl dithiocarbamic acid prepared as described above. The zinc salt precipitated in nearly quantitative yield as a soft colorless solid.

In similar manner the zinc salt of N-2-cyano ethyl N-methyl dithiocarbamic acid was prepared by precipitating with zinc sulfate from an aqueous solution of the sodium salt. The product was a cream colored solid. The zinc salt of N-2-cyano ethyl N-cyclohexyl dithiocarbamic acid prepared in the same manner was a voluminous white powder. Analysis for sulfur, nitrogen and zinc gave values of 25.15%, 10.88% and 12.76% respectively. The required values for

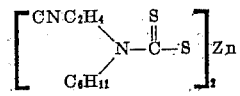

are sulfur 24.66%, nitrogen 10.79% and zinc 12.59%.

Substantially 15.2 parts by weight of cyclohexylamino propionitrile B. P. 125–127/7 mm. obtained by the reaction of cyclohexylamine and acrylonitrile (substantially 0.1 molecular proportion) and substantially 12.7 parts by weight of N,N dimethyl cyclohexylamine (substantially 0.1 molecular proportion) were charged into a glass or glass lined vessel of suitable capacity and dissolved in ether or other solvent. The solution was cooled to 20–30° C. and 7.6 parts by weight of carbon disulfide (substantially 0.1 molecular proportion) added thereto. After standing a short time crystals began to deposit on the sides and bottom of the container. The solution was cooled to 15° C., the crystalline product filtered off, washed with ether and dried. Snow white crystals M. P. 103–104° were obtained. Analysis for sulfur and nitrogen gave 18.00% sulfur and 12.05% nitrogen. The calculated values for the N,N-dimethyl cyclohexylamine salt of N-2-cyano ethyl N-cyclohexyl dithiocarbamic acid are 18.03% sulfur and 11.83% nitrogen.

Substantially 54.5 parts by weight of 90% sodium cyanide was dissolved in substantially 100 parts by weight of water and the solution cooled to 5–10° C. 166 parts by weight of approximately 30% sulfuric acid was added slowly, keeping the temperature below 10° C. 73 parts by weight of butyl amine (substantially one molecular proportion) was added and then 81.8 parts by weight of 36.7% formaldehyde. The temperature was kept at 5–15° C. throughout the addition of these reagents. The charge was heated for one hour at 50° C., cooled to 10° C. and the upper organic layer poured off and dried over anhydrous sodium sulfate. The oil was distilled collecting the fraction boiling at 77°–80° C. at 6 mm. A water white oil was obtained which was found to contain 25.08% nitrogen. The value calculated for N-cyano methyl butyl amine was 25.00% nitrogen.

Substantially 22.4 parts by weight of N-cyano methyl butyl amine, 32 parts by weight of 25% caustic soda and 250 parts by weight of water were charged into a vessel of suitable capacity and the charge cooled at 15° C. Substantially 15.2 parts by weight of carbon disulfide was then added keeping the temperature at 15–25° C. After the carbon disulfide had entered into reaction an aqueous solution containing 18.1 parts by weight of 89% zinc sulfate was added. A white powder precipitated which was filtered off and dried in an oven. The product was the zinc salt of N-cyano methyl N-butyl dithiocarbamic acid.

Substantially 22.4 parts by weight of N-2-cyano isopropyl N-ethyl amine B. P. 77–78/14 mm. (Bull. Soc. Belgique 32, 256 (1923)) and 32 parts by weight of 25% caustic soda (substantially 0.2 molecular proportion of each) and 250 parts by weight of water were charged into a vessel of suitable capacity. Substantially 15.2 parts by weight (0.2 molecular proportion) of carbon disulfide was added and the charge stirred for about three hours. A dilute aqueous solution containing 18.1 parts by weight of 89% zinc sulfate (substantially 0.1 molecular proportion) was added. A precipitate formed which was filtered off, washed free of sulfates and dried. A pale yellow powder was obtained comprising the zinc salt of N-2-cyano isopropyl N-ethyl dithiocarbamic acid.

The present invention is not limited to the specific examples hereinbefore set forth. Other methods of synthesis may be employed, different solvents substituted and other changes made as will be apparent to those skilled in the art to which this invention pertains. This invention is limited solely by the claims attached hereto as part of the present specification. Accelerating the vulcanization of rubber by means of the compounds claimed here is claimed in U. S. Patent 2,372,895 of April 3, 1945, granted to Marion W. Harman.

What is claimed is:
1. A salt of ethylene-bis-(N-2-cyano ethyl dithiocarbamic acid).
2. A metal salt of ethylene bis-(N-2-cyano ethyl dithiocarbamate).
3. A compound of the structure

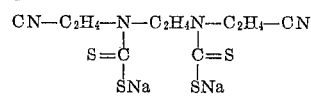

4. A heavy metal salt of ethylene-bis-(N-2-cyano ethyl dithiocarbamic acid).
5. The zinc salt of ethylene-bis-(N-2-cyano ethyl dithiocarbamic acid).

MARION W. HARMAN.

REFERENCES CITED

The following references are of record in the file of this patent:

UNITED STATES PATENTS

| Number | Name | Date |
|---|---|---|
| 2,201,172 | Hanford | May 21, 1940 |
| 2,286,738 | Hill | June 16, 1942 |
| 2,372,895 | Harman | Apr. 3, 1945 |

OTHER REFERENCES

Darapsky et al., Chem. Abstracts, vol. 31, col. 368–369.
Korner, Beilstein (4th ed., 1922), vol. 4, p. 360.
Fischer, Beilstein (4th ed., 1922), vol. 4, p. 362.
Wagner-Jauregg et al., Ber. Deut. Chem., vol. 74B, pp. 1372–1378 (1941).
Fry et al., Rec. Trav. Chim., vol. 52, pp. 1061–1066 (1933).